Figure 1:
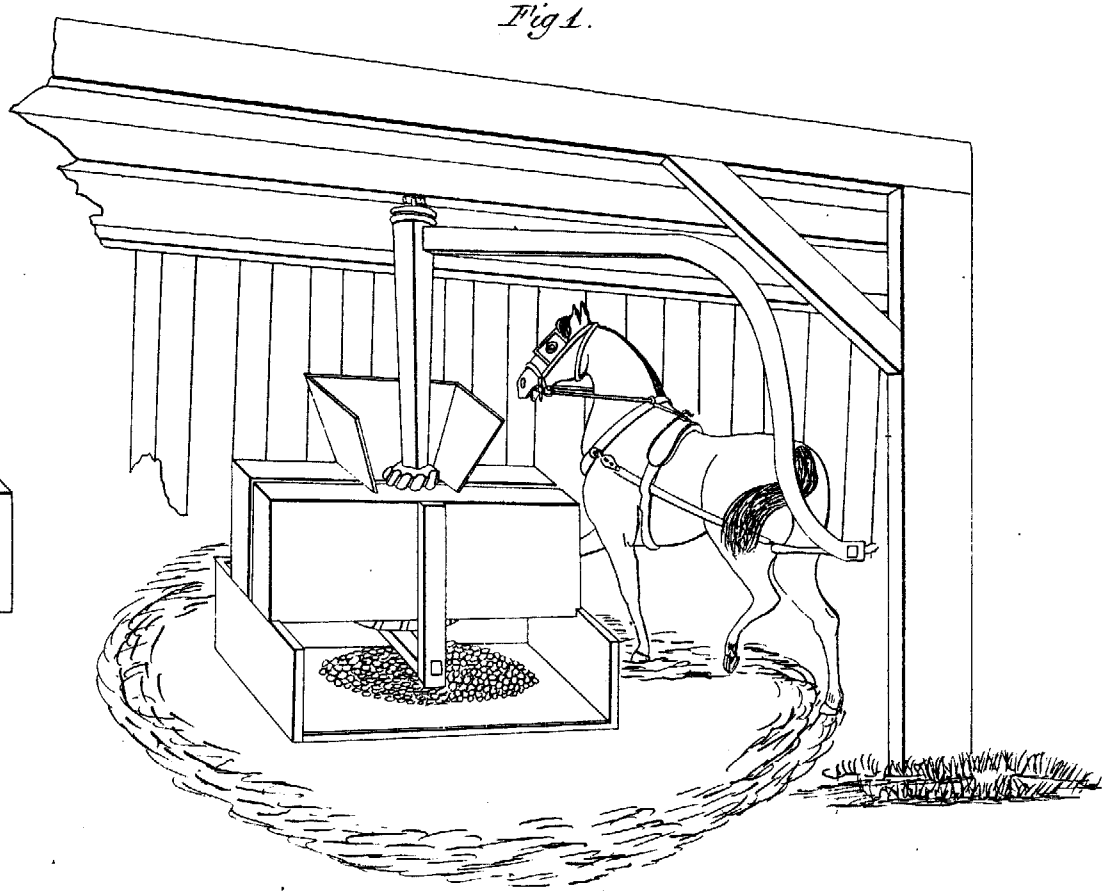
Figure 2:
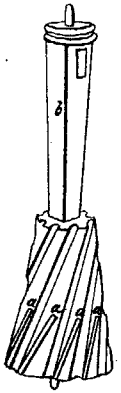
Figure 3:
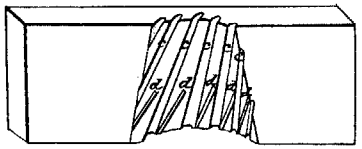

8307X

N. Booth,

Cider Mill.

Patented July 12, 1834.

A.M. PHOTO-LITHO. CO. N.Y. (OSBORNE'S PROCESS)

8307X

Nathan Booth of Cheshire, Connecticut.

Letters Patent.

The Schedule referred to in these Letters Patent and making
part of the same, containing a description in the words of the said Nathan
Booth, himself, of his Improvement in Cider Mills, called "Booths im=
proved cider mill."

To all to whom these presents shall come.

Be it known, that I Nathan Booth of Cheshire, in the County of New Haven in
the State of Connecticut, have invented a new and useful improvement
in Cider Mills, called "Booth's improved cider mill", and that the fol=
lowing is a full and exact description of the construction & operation
of said machine as invented or improved by me. My improvement
or invention consists in the application of the principles of the old, well
known box Coffee Mill to the purpose of grinding apples into Pomace.
This I effect by enlarging the size, and I also make the box or shell, and the
Cylinder as I call it, of wood, and arm each with spiral bars of iron,
so fixed on the shell and Cylinder, as to break, cut and grind the
Apples to any desirable degree of fineness in their passage through the
Mill. The Cylinder as I call it, I make of wood, and for the ordinary
size of Mills, about twenty two inches long, exclusive of the shaft, twen
ty inches in diameter at the base, and thirteen at the top being a trun=
cated cone, on the sides of this cylinder, I place, eight iron bars, one
inch wide, and half an inch thick, and about twenty four inches in
long, at equal distances, running round the cylinder at an angle of
about twenty five degrees. The upper ends of these bars, projecting
their full thickness. The lower end sunk into the wood, so as to project
only one sixteenth of an inch, thereby forming the fluting or grooves,
and the wood between the bars may be taken off to a level, down half
the length of the cylinder. From thence to the base I divide the
Cylinder into sixteen flutings or grooves. the intermediate bars
may

[illegible]

8307X may be of iron or wood, and the surface between them reduced accordingly. The number and length of the bars, as above is calculated, for a cylinder of the size described, if larger or smaller, the number and length of the bars may be proportionally increased or lessened. From the centre of the Cylinder a shaft rises perpendicularly about six feet to which is attached a lever for the application of Horse power. The shaft and Cylinder are made of the same piece of timber, and are made upright by gudgeons. The gudgeon in the upper end of the shaft is secured and plays in a crossbeam above. The lower gudgeon plays in a cross beam or lighter, which may be raised or lowered by a screw or wedge to regulate the grinding. The Cylinder is surrounded on the sides by a firm strong box or shell of wood, which I make of two pieces, of timber, each about four or five feet long, and about eighteen inches square. These timbers are hollowed out in the middle so that when firmly bolted together, they will form a box or shell around the sides of the cylinder above described, the inner diameter of which, will be about two inches larger than the diameter of the cylinder at the upper end, and about one eighth of an inch larger than its diameter at its base, and about eighteen inches in height open at top and bottom, and firmly supported over the vat so as to permit the cylinder within, to be raised or lowered at pleasure as herein before described. Around the hollow of this shell on the inside are six or eight bars of iron, of about the same size, as those on the cylinder, running diagonally at an angle of about forty five degrees, and in a direction opposite to those on the cylinder, the ends and points of the bars presenting the same projections, and forming thereby, when in operation, a succession of shears to crush and cut the apples in their descent. Openings are made between the bars, both on the shell, and on the cylinder at the upper end of the box sufficiently large to accomodate the largest apples. The iron bars are firmly secured to the sides of the cylinder and of the shell by bolts, spikes or screws, or this shell may be made in the form of a tub firmly hooped with iron

8307X iron, or the whole shell, including its bars, or fluting, may be of
Cast iron, but will be more liable to corrosion, and therefore not
to be preferred. — The Mill or Machine herein described is cal=
culated to stand with the cylinder, and shaft perpendicular,
having a hopper around the shaft and over the opening on the
top to receive the apples, and a suitable vat to receive the pomace
at the bottom, & is to be moved by horse, or ox power, all in the usu=
al manner. but, the mill may be placed horizontally with the
Hopper and a suitable opening on the upper side, and moved
by water or other power. A model with drawings for illustration
will accompany this Specification. The advantages of this
invention, or improvement are, that apples are more expe=
ditiously, and more uniformly crushed and ground and the pomace
more more perfectly and uniformly formed than is or can be
done by any known Mill, as the whole may be made to pass a
Space between the cylinder, and shell, not exceeding, if so required
one sixteenth of an inch, and this space may be lessened or enlarged
at pleasure. This Mill thus armed with iron, is not subject to
ordinary wear and tear, and is not liable to be injured by stones
and stones when found in the Mill can be ejected by reversing the
Motion. As the Basis of my improvement and invention, is the old
and well known box, Coffee Mill. I claim only as my invention
the use of iron bars to arm wooden cylinders, and shells of proper
size, with suitable teeth and fluting to form a strong and durable surface
peculiarly adapted to grinding apples for cider. in the manner as above
specified. and therefore I solicit Letters Patent.

In witness whereof I subscribe this Specification at New
Haven June fourteenth A D 1834.

Nathan Booth

Con
WR

Witnesses
Simon Baldwin
Ebenezer Baldwin

[illegible]

1080 [illegible] (Patented July 12, 1834)